(12) United States Patent
Gasbarro

(10) Patent No.: US 8,272,927 B2
(45) Date of Patent: Sep. 25, 2012

(54) POULTRY SHOULDER AND NECK SKINNER

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 335 days.

(21) Appl. No.: 12/582,859

(22) Filed: Oct. 21, 2009

(65) Prior Publication Data

US 2011/0092146 A1   Apr. 21, 2011

(51) Int. Cl.
*A22B 5/16* (2006.01)
(52) U.S. Cl. ...................................................... 452/125
(58) Field of Classification Search ............. 452/82–86, 452/125, 128–130, 111–114, 136, 138
See application file for complete search history.

(56) References Cited

U.S. PATENT DOCUMENTS

| | | | | |
|---|---|---|---|---|
| 6,086,470 A | * | 7/2000 | Ranniger | 452/127 |
| 6,264,542 B1 | | 7/2001 | Gasbarro | |
| 7,465,224 B1 | * | 12/2008 | Royall | 452/86 |
| 7,530,888 B2 | * | 5/2009 | Annema et al. | 452/167 |

* cited by examiner

*Primary Examiner* — Richard Price, Jr.
(74) *Attorney, Agent, or Firm* — Jason H. Foster; Kremblas & Foster

(57) ABSTRACT

An automated apparatus for removing skin from the shoulder and neck areas of a chicken carcass that includes a neck skinner and a shoulder skinner mounted to an elongated support wall in a longitudinally spaced relationship. The neck skinner includes a rotatably-driven gripper having a plurality of fins extending radially therefrom. A pinch block with an arcuate surface is mounted in a close-clearance relationship with the gripper to form a pinch point therebetween. The pinch point of the neck skinner is positioned to engage the neck area of an incoming chicken. The shoulder skinner is substantially similar to the neck skinner except that the pinch point of the shoulder skinner is positioned to engage the shoulder area of an incoming chicken. The apparatus further includes a rotatably-driven indexing conveyor laterally adjacent the neck and shoulder skinners for maintaining a longitudinal separation between chickens that are conveyed through the skinning apparatus.

17 Claims, 7 Drawing Sheets

POULTRY SHOULDER AND NECK SKINNER

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to poultry processing devices and more particularly to an automated device for removing skin from the neck and shoulder areas of a chicken.

2. Description of the Related Art

Over the past several decades, the process of removing skin from the neck and shoulder portions of poultry carcasses has largely been performed manually, which requires skilled labor. Even with a properly trained workforce, however, the removal process has historically been associated with the potential for accidental injury, significant labor cost, and a certain level of inconsistency of performance naturally attendant with any manual chore of this type.

It is therefore desirable to have means for efficiently removing skin from the neck and shoulder areas of poultry, particularly chicken and sometimes turkeys, for maximizing consistency while minimizing production costs and the risk of accidental injury.

BRIEF SUMMARY OF THE INVENTION

The apparatus of the present invention includes a skinning station mounted atop a base. The skinning station preferably includes first and second elongated support walls that are positioned in a parallel, laterally-spaced relationship. The skinning station further includes a neck skinner and a shoulder skinner that are mounted to the first support wall in a longitudinally side-by-side relationship intermediate the first support wall and the second support wall.

The neck skinner includes a rotatably-driven gripper having a plurality of fins extending radially therefrom. A pinch block is mounted laterally intermediate the gripper and the second support wall and has an arcuate surface terminating in a tapered lip in a close-clearance relationship with the gripper for trapping and pulling poultry skin into a pinch point defined therebetween. The pinch point of the neck skinner is positioned to engage the neck area of a chicken carcass that is conveyed through the skinning station. The shoulder skinner is substantially similar to the neck skinner, but has a pinch point that is positioned to engage the shoulder area of a chicken carcass that is conveyed through the skinning station The skinning station preferably also includes a rotatably-driven indexing conveyor mounted to the second support wall laterally intermediate the neck and shoulder skinners and the second support wall. The indexing conveyor is a conventional chain conveyor having a plurality of evenly-spaced guide prongs extending outwardly therefrom for engaging, and maintaining a minimum longitudinal separation between, successive chicken carcasses that are conveyed through the skinning station.

During typical operation of the skinning apparatus, a headless chicken carcass hung from a shackle line is guided toward an inlet end of the skinning station with the chest of the chicken preferably facing the neck skinner. The rear of the chicken is brought into engagement with the indexing conveyor and is forced into a position longitudinally intermediate the guide prongs of the conveyor. As the chicken is longitudinally conveyed through the skinning station, the dangling neck of the chicken is first moved onto the top surface of the pinch block of the neck skinner and is supported thereon with the front of the neck forcibly held in engagement with a pinch point intermediate the tapered lip of the pinch block and the rotating fins of the gripper. The rotating fins thus trap and pull skin from the neck area of the chicken into the pinch point as the chicken is conveyed along the neck skinner. The removed skin is then preferably allowed to fall by gravity into a waste collection bin below.

Next, after the hanging chicken has been longitudinally conveyed past the neck skinner, the breast of the chicken is moved into engagement with the pinch block of the shoulder skinner with the front of the chicken's shoulder forcibly held in engagement with a pinch point intermediate the tapered lip of the pinch block and the rotating fins of the gripper of the shoulder skinner. The rotating fins thus trap and pull skin from the shoulder area of the chicken into the pinch point as the chicken is conveyed along the shoulder skinner. The removed skin is then preferably allowed to fall by gravity into the waste collection bin below. The chicken then exits an outlet end of the skinning station and is ready for further processing.

Therefore, it is an aspect of the present invention to provide an automated skinning apparatus which safely and efficiently removes skin from the neck and shoulder areas of a chicken.

Figure 1:
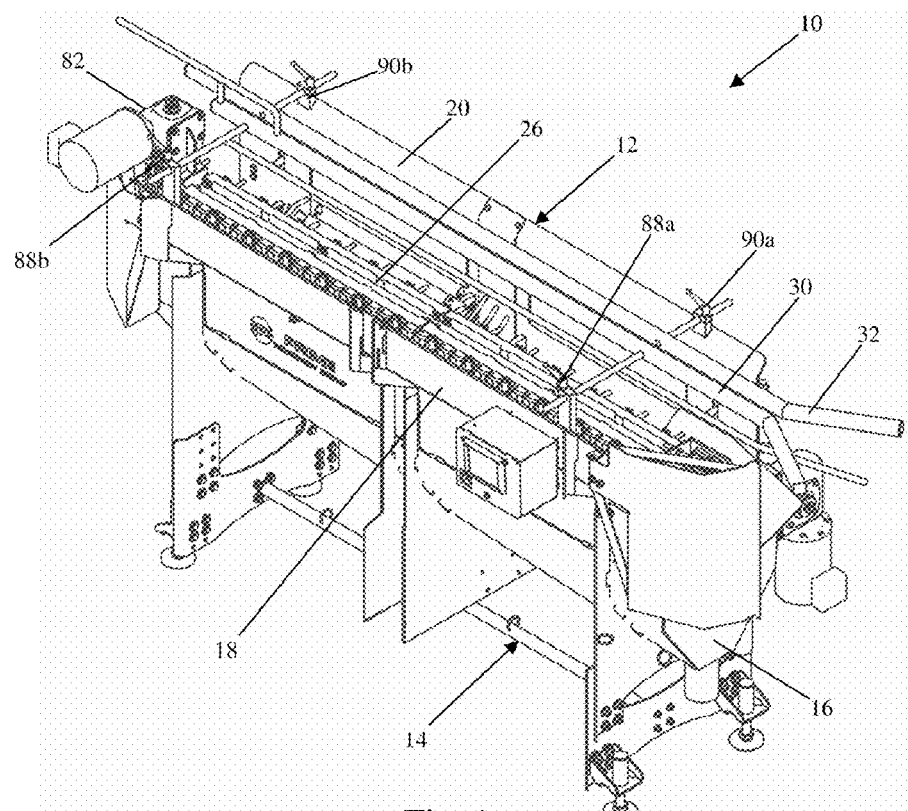
FIG. 1 is a perspective view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word "connected" or terms similar thereto are often used. They are not limited to direct connection, but include connection through other elements where such connection is recognized as being equivalent by those skilled in the art.

DETAILED DESCRIPTION OF THE INVENTION

Figure 2:
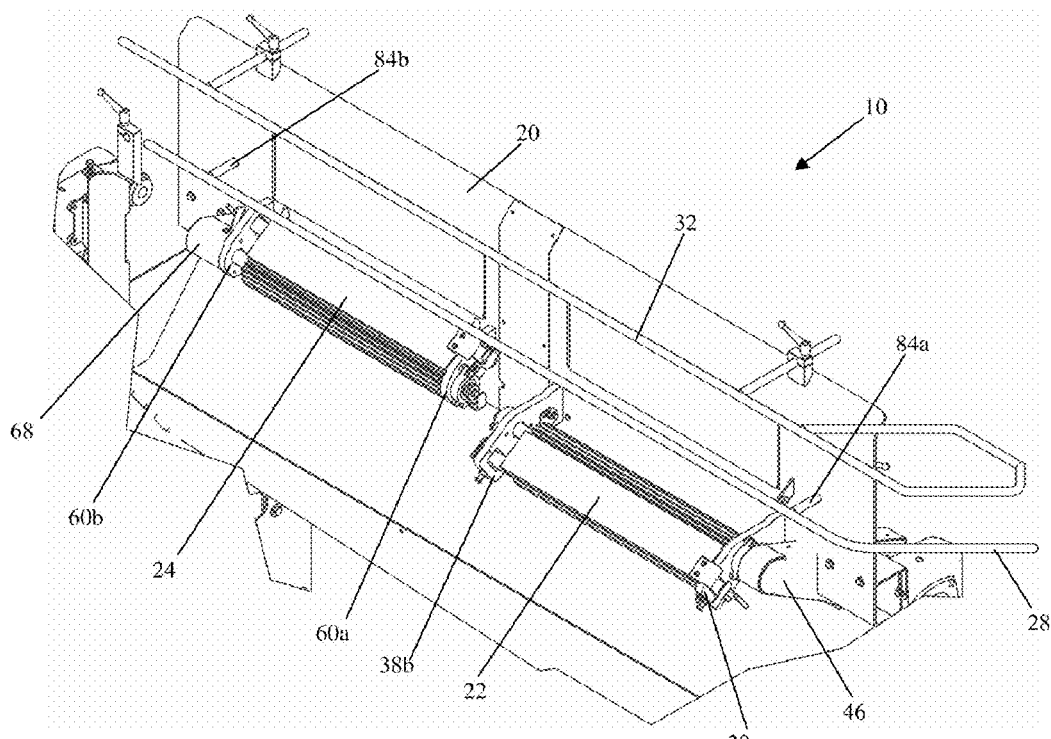
FIG. 2 is a cutaway, perspective view illustrating the skinning station of the preferred embodiment of the present invention shown in FIG. 1.

Referring to FIGS. 1 and 2, a skinning apparatus 10 in accordance with the present invention is illustrated. The apparatus 10 removes skin from the neck and shoulder of a chicken carcass. It is contemplated that the apparatus 10 can be used to process any other type of poultry in a similar manner as described herein, with any modifications known to the person of ordinary skill, to accommodate the different sizes and/or proportions of various animals.

The skinning apparatus 10 includes a skinning station, indicated generally at 12, which is mounted to the top of a base, indicated generally at 14, for conveniently locating the apparatus 10 in the most practical arrangement for a given plant production layout. The skinning apparatus 10 preferably also includes a collection trough 16 that is mounted to the base 14 below the skinning station 12 for collecting and diverting waste product as will be further described below.

Unless otherwise noted, all components of the skinning apparatus 10 are fabricated from stainless steel. It is contemplated that all other sufficiently rigid, food-grade materials, such as aluminum and Delrin, can additionally or alternatively be used in fabricating various components of the skinning apparatus 10.

For the sake of convenience and clarity, terms such as "front," "rear," "top," "bottom," "up," "down," "inwardly," "outwardly," "lateral," and "longitudinal" will be used herein to describe the relative placement and orientation of various components of the invention, all with respect to the geometry and orientation of the skinning apparatus 10 as it appears in FIG. 1. Particularly, "front" shall refer to the rightmost longitudinal end of the skinning apparatus 10 as it appears in FIG. 1, and "rear" shall refer to the leftmost longitudinal end of the skinning apparatus 10 as it appears in FIG. 1. Said terminology will include the words specifically mentioned, derivatives thereof, and words of similar import.

The skinning station 12 of the skinning apparatus 10 includes support walls 18 and 20, a neck skinner 22, a shoulder skinner 24, an indexing conveyor 26 (see FIGS. 1 and 7), a bumper rail 28, and guide rails 30 and 32. The support walls 18 and 20 extend upwardly from the base 14 in a laterally-spaced, parallel relationship and define a product inlet at the front of the skinning station 12 and a product outlet at the rear of the skinning station 12. The neck skinner 22 and the shoulder skinner 24 are mounted to the inwardly-facing surface of the support wall 20 in a side-by-side, horizontal orientation with the neck skinner 22 nearer the inlet end of the skinning station 12 (i.e., upstream relative to the shoulder skinner 24) and the shoulder skinner 24 nearer the outlet end of the skinning station 12 (i.e., downstream relative to the neck skinner 22). Although the support walls 18 and 20 are preferred for supporting the other components of the skinning station 12, it is contemplated that any other suitable supportive structure, such as a rigid frame constructed from stainless steel tubing, can alternatively or additionally be incorporated.

Figure 3:
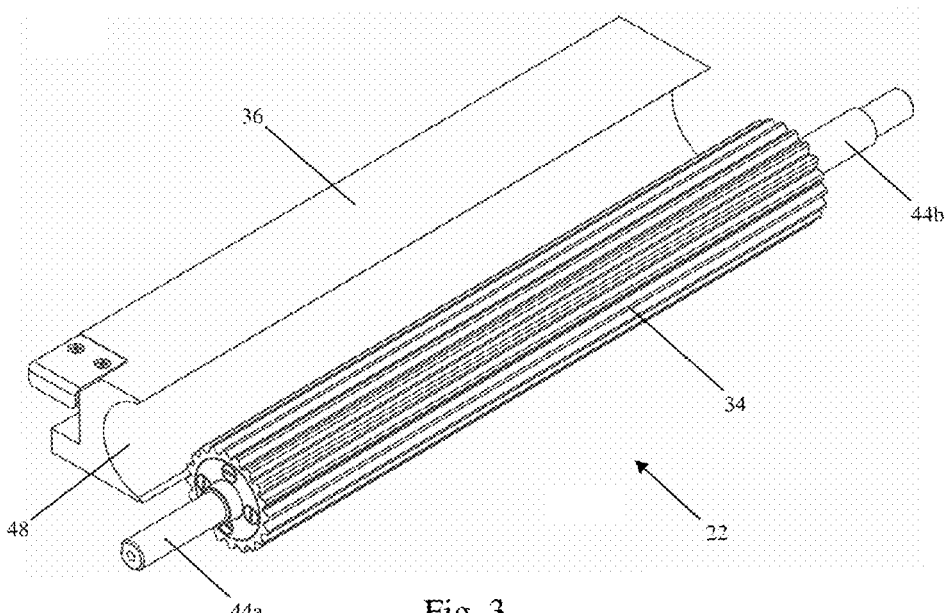
FIG. 3 is a detail, perspective view illustrating the gripper and the pinch block of the neck skinner of the preferred embodiment of the present invention shown in FIG. 1.
Figure 4:
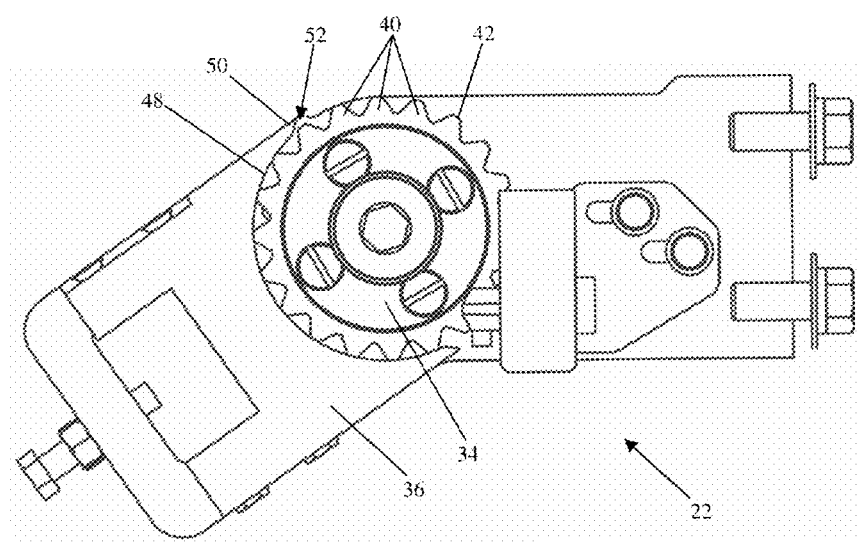
FIG. 4 is a detail, end-on view illustrating the neck skinner of the preferred embodiment of the present invention shown in FIG. 1.

Referring now to FIGS. 2-4, the neck skinner 22 includes a gripper 34, a pinch block 36, and a pair of mounting brackets 38a and 38b. The gripper 34 is a generally cylindrical member provided with a plurality of raised projections or fins 40. Preferably, the fins 40 are formed by creating axially aligned V-shaped recesses or voids in the outer cylindrical surface of a cylindrical body to leave an essentially flat surface 42 at the outer end of each fin 40. Although the fins 40 are preferred, it is contemplated that the gripper 34 can alternatively or additionally incorporate other types of minimally or moderately frictional surface features or materials that are adapted to grip poultry skin, muscle or other external soft tissue without significantly damaging it. For example, a gripper can be provided with a series of shallow, narrow ridges ("gnurling") formed in its surface for gripping poultry skin by frictional engagement.

The longitudinal ends of the gripper 34 terminate in cylindrical mounting shafts 44a and 44b that are rotatably mounted to the mounting brackets 38a and 38b, such as by mounting in conventional replaceable bearings, for allowing the gripper 34 to rotate freely about its own longitudinal axis. The mounting brackets 38a and 38b are rigidly mounted to the inwardly-facing surface of the support wall 20, such as with welds or conventional fasteners. The gripper 34 is thereby held in a parallel orientation relative to the support wall 20 and is positioned longitudinally adjacent the inlet end of the skinning station 12.

The mounting shaft 44a extending from the front end of the gripper 34 extends through the mounting bracket 38a and into a drive housing 46. A drive pulley (not within view) is operatively mounted to the forward mounting shaft 44a within the drive housing 46. A conventional electric motor is operatively connected to the drive pulley by a cogged belt (not within view) for rotating the gripper 34 in a counterclockwise direction as viewed end-on in FIG. 4. Although the drive system described above is preferred for driving the gripper 34 of the neck skinner 22, it is contemplated that any type of conventional drive system, such as one that includes a conventional series of drive sprockets and drive chains as described in U.S. Pat. No. 6,264,542 to Gasbarro (herein incorporated by reference), can additionally or alternatively be used.

Still referring to FIGS. 2-4, the pinch block 36 is an elongated, unitary body that is preferably formed from Delrin. The pinch block 36 is removably mounted to the mounting brackets 38a and 38b laterally intermediate the gripper 34 and the support wall 18 in a parallel relationship with the gripper 34. The pinch block 36 features an arcuate surface 48 that is disposed in a close clearance relationship to the arcuate path defined by the rotation of the outer surfaces 42 of the fins 40 of the gripper 34. A tapered lip 50 defines the upper end of the arcuate surface 48 which terminates at about the 10 o'clock position of the gripper 34 as viewed end-on in FIG. 4. The tapered lip 50 closely mates with the ends of the fins 40 as they rotatably approach the pinch block 36 during operation of the neck skinner 22, thereby forming a pinch point 52 intermediate the lip 50 and an adjacent fin 40.

Figure 5:
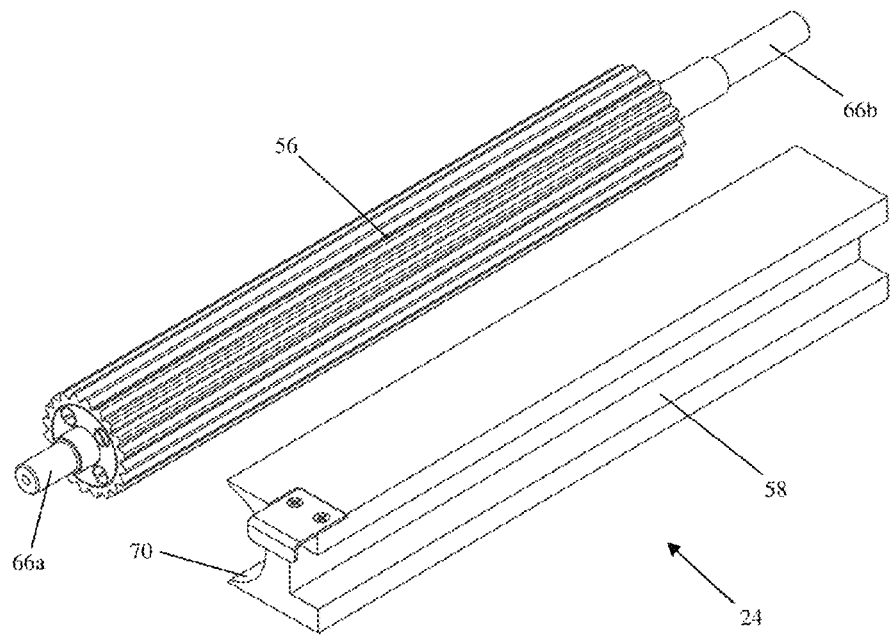
FIG. 5 is a detail, perspective view illustrating the gripper and pinch block of the shoulder skinner of the preferred embodiment of the present invention shown in FIG. 1.
Figure 6:
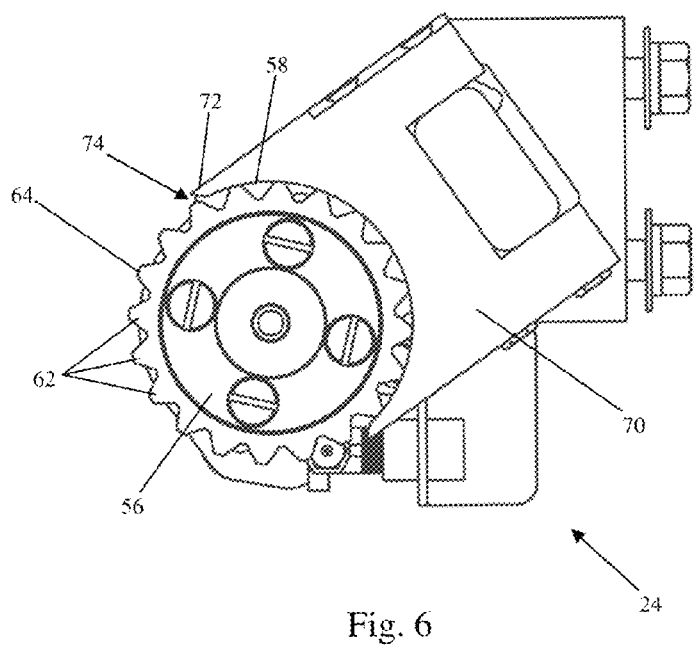
FIG. 6 is a detail, end-on view illustrating the shoulder skinner of the preferred embodiment of the present invention shown in FIG. 1.

Referring now to FIGS. 2, 5 and 6, the shoulder skinner 24 includes a gripper 56, a pinch block 58, and a pair of mounting brackets 60a and 60b that are substantially similar to the gripper 34, pinch block 36 and mounting brackets 38a and 38b, respectively, of the neck skinner 22 described above. The gripper 56 is a generally cylindrical member provided with a plurality of raised projections or fins 62. Preferably, the fins 62 are formed by creating axially aligned V-shaped recesses or voids in the outer cylindrical surface of a cylindrical body to leave an essentially flat surface 64 at the outer end of each fin 62. Although the fins 62 are preferred, it is contemplated that the gripper 56 can alternatively or additionally incorporate other types of minimally or moderately frictional surface features or materials that are adapted to grip poultry skin, muscle or other external soft tissue without significantly damaging it. For example, a gripper can be provided with a series of shallow, narrow ridges ("gnurling") formed in its surface for gripping poultry skin by frictional engagement.

The longitudinal ends of the gripper 56 terminate in cylindrical mounting shafts 66a and 66b that are rotatably mounted to the mounting brackets 60a and 60b, such as by mounting in conventional replaceable bearings, for allowing the gripper 56 to rotate freely about its own longitudinal axis. The mounting brackets 60a and 60b are rigidly mounted to the inwardly-facing surface of the support wall 20, such as with welds or conventional fasteners. The gripper 56 is thereby held in a parallel orientation relative to the support wall 20 and is positioned adjacent the outlet end of the skinning station 12.

The mounting shaft 66b extending from the rear end of the gripper 56 extends through the mounting bracket 60b and into a drive housing 68. A drive pulley (not within view) is operatively mounted to the forward mounting shaft 66a within the drive housing 68. A conventional electric motor is operatively connected to the drive pulley by a cogged belt (not with view) for rotating the gripper 56 in a clockwise direction when viewed end-on as in FIG. 6. Although the drive system described above is preferred for driving the gripper 56 of the shoulder skinner 24, it is contemplated that any type of conventional drive system, such as one that includes a conventional series of drive sprockets and drive chains as described in U.S. Pat. No. 6,264,542 to Gasbarro, can additionally or alternatively be incorporated.

Still referring to FIGS. 2, 5 and 6, the pinch block 58 is an elongated, unitary body that is preferably formed from Delrin. The pinch block 58 is removably mounted to the mounting brackets 60a and 60b laterally intermediate the gripper 56 and the support wall 18 in a parallel relationship with the gripper 56. The pinch block 58 features an arcuate surface 70 that is disposed in a close clearance relationship to the arcuate path defined by the rotation of the outer surfaces 64 of the fins 62 of the gripper 56. A tapered lip 72 defines the upper end of the arcuate surface 70 which terminates at about the 10 o'clock position of the gripper 56 as viewed end-on in FIG. 4. The tapered lip 72 closely mates with the ends of the fins 62 as they rotatably approach the pinch block 58 during operation of the shoulder skinner 24, thereby forming a pinch point 74 intermediate the lip 72 and an adjacent fin 62.

Figure 7:
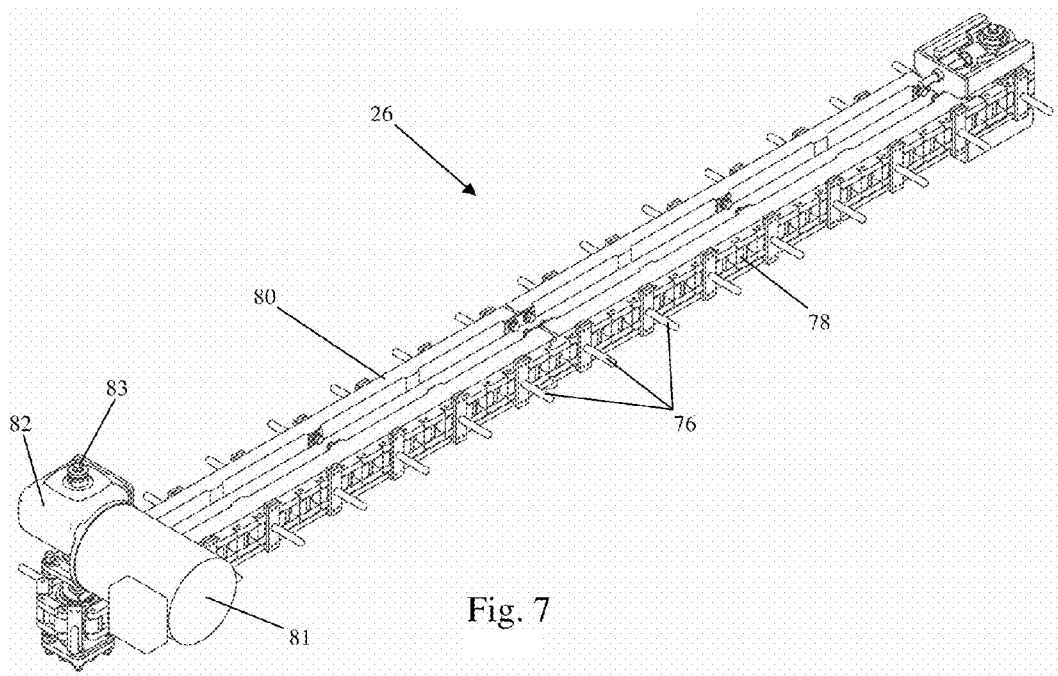
FIG. 7 is a detail, perspective view illustrating the indexing conveyor of the preferred embodiment of the present invention shown in FIG. 1.

Referring to FIGS. 1 and 7, the indexing conveyor 26 is a conventional chain conveyor having a drive chain 78 that is rotatably driven about an elongated track 80. A plurality of evenly-spaced guide prongs 76 are rigidly mounted to the drive chain 78 and extend perpendicularly outwardly therefrom. The longitudinal ends of the indexing conveyor 26 are rigidly mounted to the base 14, such as with welds or conventional fasteners. The indexing conveyor 26 is thereby securely positioned laterally adjacent the neck and shoulder skinners 22 and 24 in a parallel relationship therewith.

During operation of the indexing conveyor 26, the horizontally projecting guide prongs 76 travel longitudinally from the inlet end to the outlet end of the skinning station 12 in the longitudinal path of chickens or other poultry that are conveyed through the skinning apparatus 10. The distance between each adjacent guide prong 76 of the indexing conveyor 26 is preferably large enough to accommodate the girth of a largest contemplated chicken to be processed by the skinning apparatus 10. The ends of the guide prongs 76 are preferably dull to mitigate damage to the flesh of poultry that are engaged by the indexing conveyor 26, as will be described in greater detail below.

A drive shaft 83 extends upwardly from a drive gear (not within view) at the rear end of the indexing conveyor 26 and into a drive housing 82. A conventional electric motor 81 is located adjacent the drive housing 82 and is operatively connected to the drive shaft 83 for rotatably driving the indexing conveyor 26 through its vertical drive shaft 83 and idler axis points. Although the drive system described above is preferred for driving the indexing conveyor 26, it is contemplated that any type of conventional drive system, such as one that includes a conventional series of drive sprockets and drive chains as described in U.S. Pat. No. 6,264,542 to Gasbarro, can additionally or alternatively be incorporated. It is further contemplated that the indexing conveyor 26 and its drive system can be entirely omitted from the skinning station 12, and that an elongated wall, shield, rail, or rotatably-driven screw auger can be substituted for the indexing conveyor 26.

Figure 9:
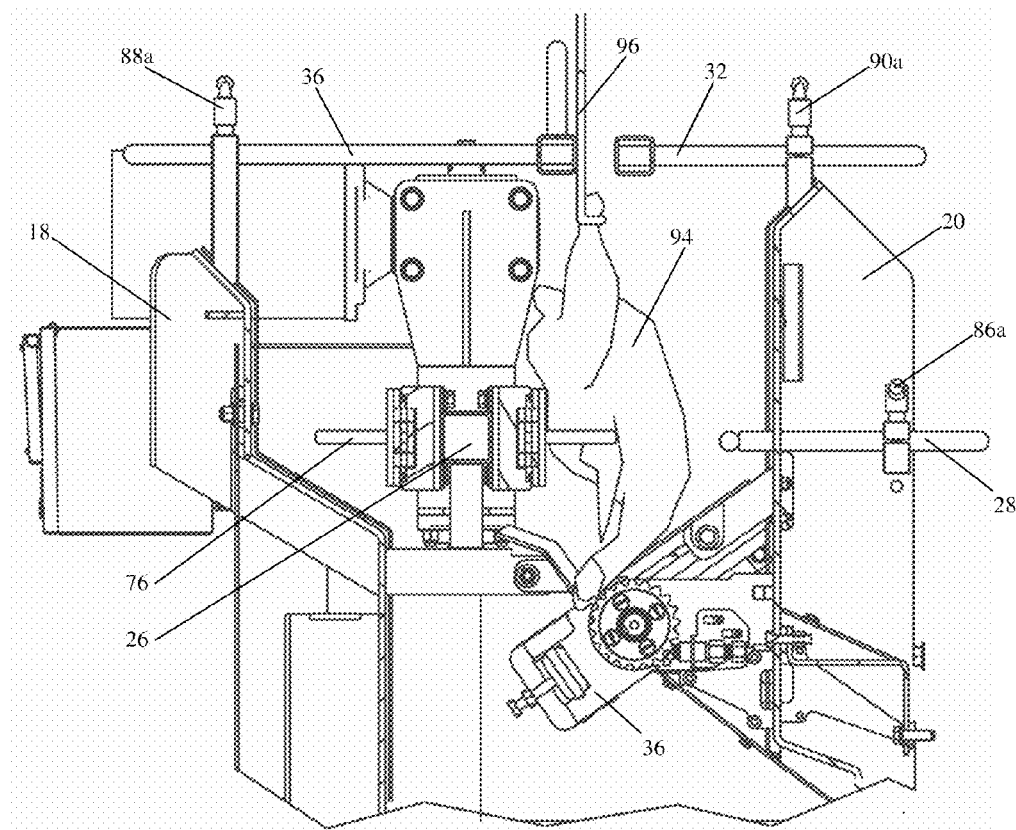
FIG. 9 is a cutaway, end-on view illustrating the skinning station of the preferred embodiment of the present invention shown in FIG. 1 during operation.

Referring now to FIGS. 2 and 9, the bumper rail 28 is an elongated bar that is mounted to the inwardly facing surface of the support wall 20 above the neck and shoulder skinners 22 and 24, extending horizontally and preferably continuously from the inlet end to the outlet end of the skinning station 12. Mounting posts 84a and 84b extend perpendicularly from the bumper rail 28 through apertures in the support wall 20 and into adjustable, vice-like mounting grips 86a and 86b (the mounting grip 86b is not within view, but it is substantially identical to the mounting grip 86a) that are rigidly affixed to the outwardly facing surface of the support wall 20. By rotating the levers of the mountings grips 86a and 86b, the mounting grips 86a and 86b can be loosened or tightened about the mounting posts 84a and 84b in a conventional manner. This allows or prevents, respectively, axial movement of the mounting posts 84a and 84b relative to the mounting grips 86a and 86b, thereby by facilitating lateral adjustment of the position of the bumper rail 28 relative to the support wall 20. A forward-most segment of the bumper rail 28 is preferably angled toward the support wall 20 for channeling incoming poultry into the inlet end of the skinning station 12 as will be further described below. It is contemplated that an elongated shield or wall can be substituted for the bumper rail 28 to achieve the same functional purpose as will be described in greater detail below.

Referring to FIGS. 1 and 9, the guide rails 30 and 32 are substantially identical in structure to the bumper rail 28 and are mounted to the support walls 18 and 20 in a similarly adjustable manner through incorporation of mounting grips 88a, 88b, 90a and 90b. The guide rails 30 and 32 are positioned above the indexing conveyor 26 in a parallel, spaced relationship with a lateral separation of about 4 inches between the guide rails 30 and 32. Like the bumper rail 28, the forward-most segments of the guide rails 30 and 32 are angled toward their respective adjacent support walls 18 and 20 for engaging and channeling incoming shackles toward a predetermined lateral position within the skinning station 12 as will be further described below. It is contemplated that elongated shields or walls can be substituted for the guide rails 30 and 32 to achieve the same functional purpose as will be described in greater detail below.

Figure 8:
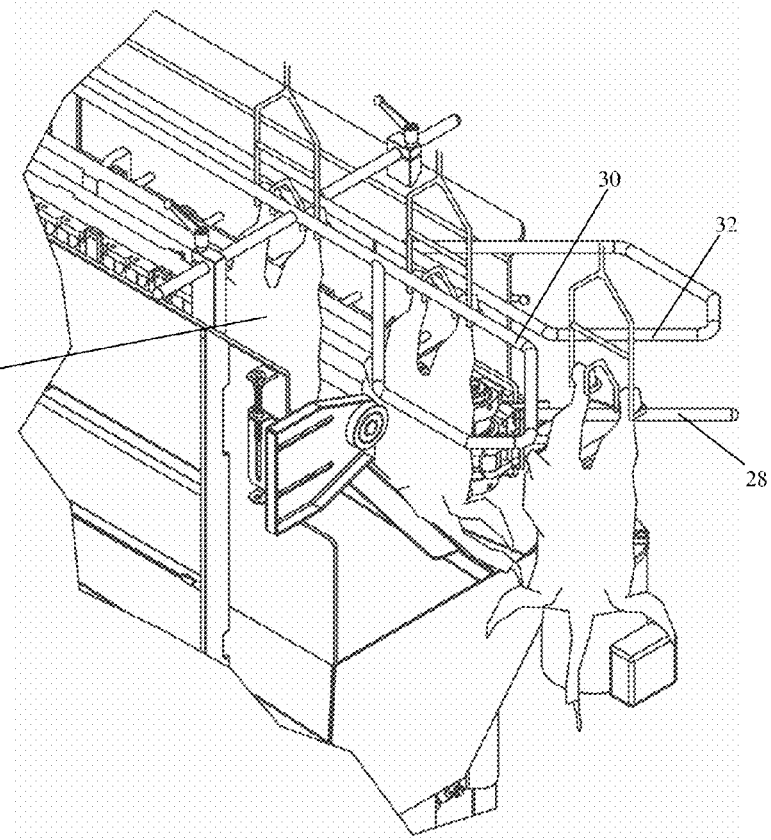
FIG. 8 is a cutaway, perspective view illustrating the inlet end of the skinning station of the preferred embodiment of the present invention shown in FIG. 1.

During typical operation, a headless chicken carcass 94 (referred to herein as "the chicken 94") hung from a conventional shackle line 96 is longitudinally conveyed toward the inlet end of the skinning station 12 with the chest of the chicken 94 preferably facing the support wall 20 as illustrated in FIGS. 8 and 9. As the chicken 94 and its respective shackle line 96 approach the inlet end of the skinning station 12, they engage the angled portions of the bumper rail 28 and guide rails 30 and 32 and are thereby channeled toward a predetermined lateral position within the skinning station 12 that is dictated by the positions of the rails 28-32. The rear of the chicken 94 is thus brought into engagement with the moving guide prongs 76 of the indexing conveyor 26 and is urged by gravity into a position longitudinally intermediate the guide prongs 76. Simultaneously, the chest of the chicken 94 is brought into engagement with the longitudinally-oriented portion of the bumper rail 28. With the chicken positioned thusly, the indexing conveyor 26 and the bumper rail 28 prevent excessive lateral movement of the leg and chest portions of the chicken 94 as the chicken 94 is conveyed longitudinally from the inlet end of the skinning station 12 toward the outlet end of the skinning station 12. The moving guide prongs 76 of the indexing conveyor 26 maintain a continuous, uniform, longitudinal separation between the lower ends of successive chickens as they advance through the skinning station 12 while the shackle line 96 keeps the upper end spaced apart evenly.

Figure 10:
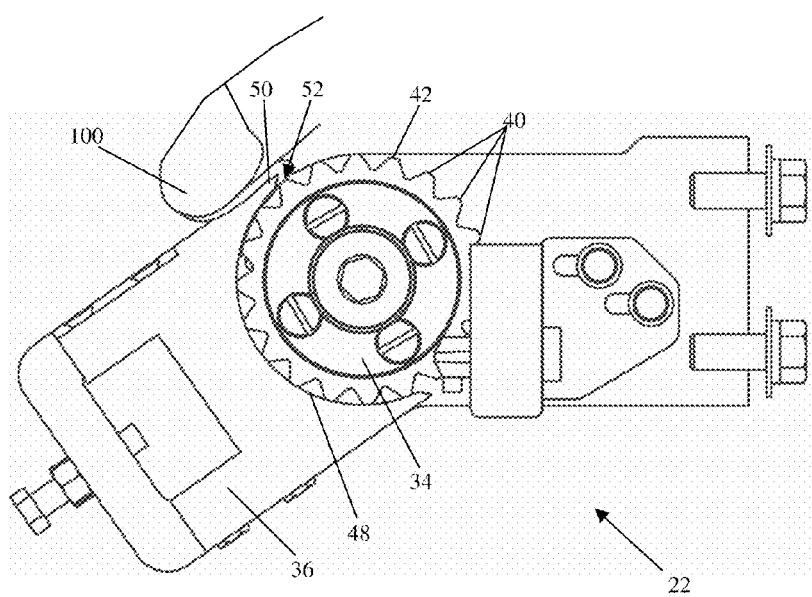
FIG. 10 is a detail, end-on view illustrating the neck skinner of the preferred embodiment of the present invention shown in FIG. 1 during operation.

Next, referring to FIGS. 9 and 10, the dangling neck 100 of the chicken 94 is moved onto the top surface of the pinch block 36 of the neck skinner 22 and is supported thereon at an angle of approximately 45 degrees to horizontal, with the front of the neck 100 forcibly held in engagement with the pinch point 52 by gravity and by the indexing conveyor 26. As the chicken 94 advances from one longitudinal end of the neck skinner 22 to the other, the outer ends 42 of the rotating fins 40 engage the skin on the neck 100 and, approaching the pinch point 52, cooperate with the lip 50 defining the upper end of the arcuate surface 48 to pinch or trap the skin between the outer ends 42 and the lip 50 of the arcuate surface 48. As each fin 40 pulls a segment of skin downwardly between the gripper 34 and the pinch block 36, a successive fin 40 engages and pulls a successive segment of skin. With this continuous pulling by successive, rotatably driven fins 40, the skin is continuously pulled from the neck 100 of the chicken 94 in one contiguous piece as the neck 100 is drawn longitudinally along the neck skinner 22. The removed skin is then conveyed in a counterclockwise direction between the gripper 34 and the pinch block 36 to the lower terminus of the arcuate path defined by the pinch block 36, where it is allowed to fall by gravity into the collection bin 16 (see FIG. 1) below. It has been found through testing that the neck skinner 22, employed in the manner described above, effectively removes all of the skin from a chicken's neck above the chicken's shoulder area.

Figure 11:
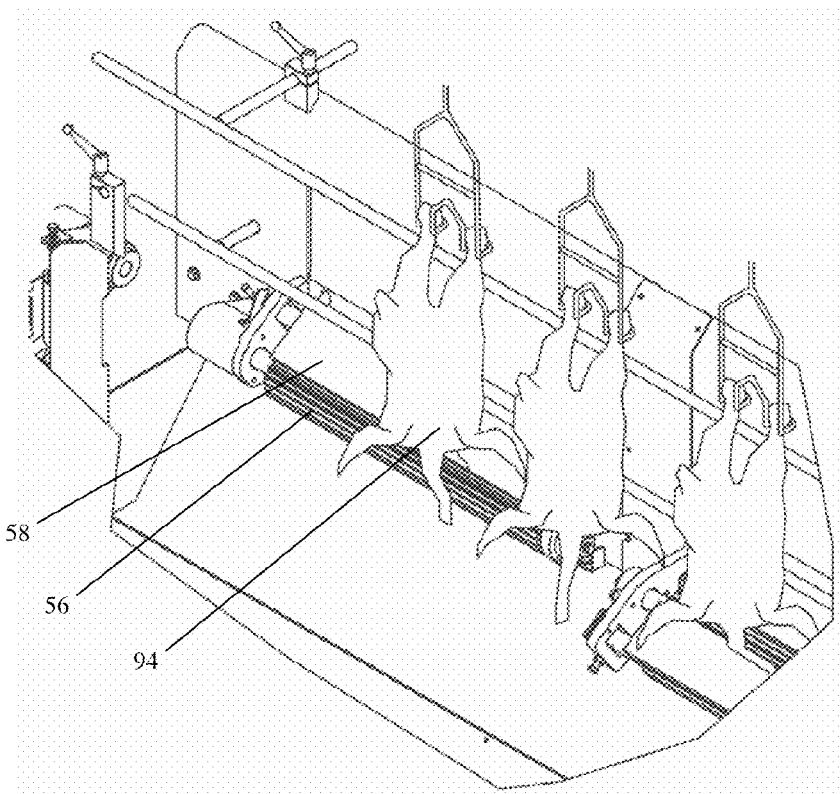
FIG. 11 is a cutaway, perspective view illustrating the shoulder skinner of the preferred embodiment of the present invention shown in FIG. 1 during operation.
Figure 12:
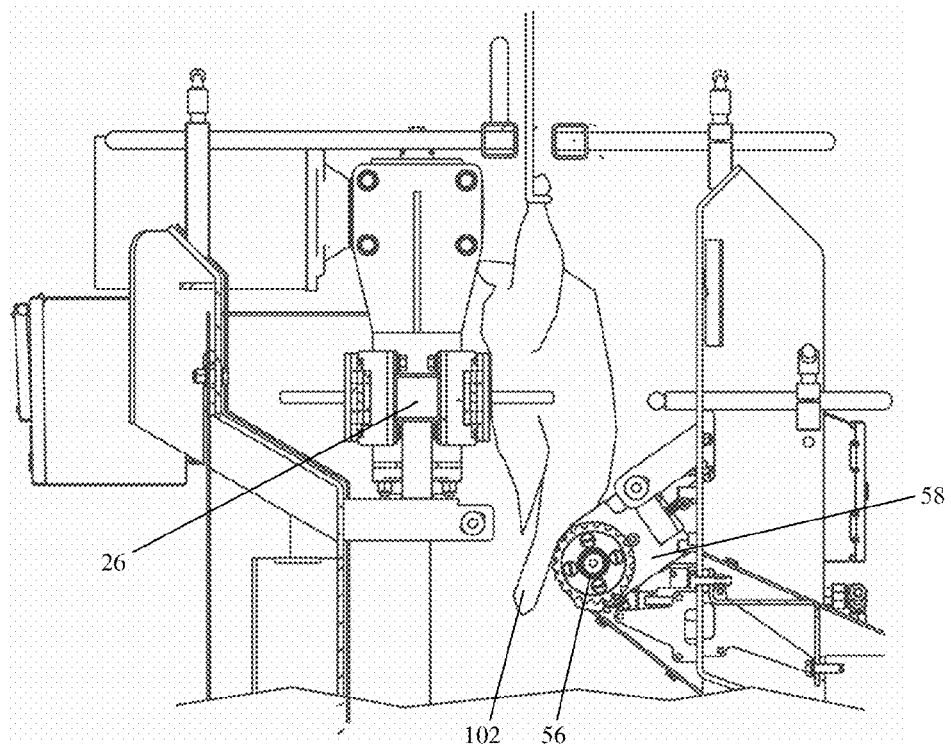
FIG. 12 is an end-on view illustrating the skinning station of the preferred embodiment of the present invention shown in FIG. 1 during operation.
Figure 13:
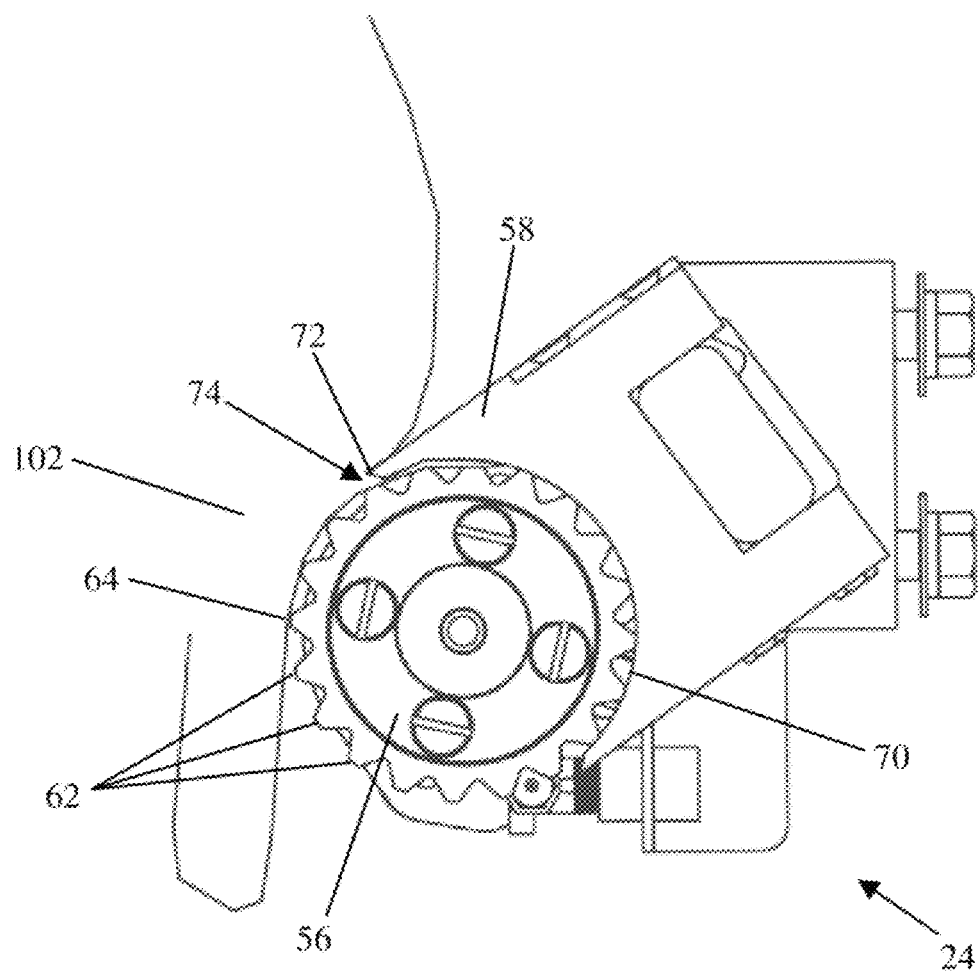
FIG. 13 is a detail, end-on view illustrating the shoulder skinner of the preferred embodiment of the present invention shown in FIG. 1 during operation.

Next, referring to FIGS. 11-13, the breast of the chicken 94 is moved into engagement with the top surface of the pinch block 58 of the shoulder skinner 24 with the front of the chicken's shoulder 102 forcibly held in engagement with the pinch point 74 by gravity and by the indexing conveyor 26. As the chicken 94 advances from one longitudinal end of the shoulder skinner 24 to the other, the outer ends 64 of the rotating fins 62 engage the skin on the shoulder 102 and, approaching the pinch point 74, cooperate with the lip 72 defining the upper end of the arcuate surface 70 to pinch or trap the skin between the outer ends 64 and the lip 72. As each fin 62 pulls a segment of skin upwardly, between the gripper 56 and the pinch block 58, a successive fin 62 engages and pulls a successive segment of skin. With this continuous pulling by successive, rotatably driven fins 62, the skin is continuously pulled from the shoulder 102 of the chicken 94 in one contiguous piece as the shoulder 102 is drawn longitudinally along the shoulder skinner 24. The removed shoulder skin is then conveyed in a clockwise direction between the gripper 56 and the pinch block 58 to the lower terminus of the arcuate path defined by the pinch block 58, where it is allowed to fall by gravity into the collection bin 16 (see FIG. 1) below. It has been found through testing that the shoulder skinner 24, employed in the manner described above, effectively removes all of the skin from a chicken's shoulder area above the chicken's breast (assuming the skin from the chicken's neck has already been removed).

Finally, the chicken 94 longitudinally exits the outlet end of the skinning station 12 with the skin from its neck and shoulder areas removed. The chicken 94 can then be inspected and passed along for further processing as necessary.

In view of the foregoing description, it should be readily understood that the present invention provides an improved apparatus and method for removing the skin from the neck and shoulder areas of a chicken or other poultry. An alternative embodiment of the above-described skinning apparatus 10 is contemplated in which the shoulder skinner 24 is omitted and only the neck skinner 22 is employed for removing skin from only the neck areas of chickens. A further alternative embodiment of the device is contemplated in which the neck skinner 22 is omitted and only the shoulder skinner 24 is employed for removing skin only from the shoulder areas of chickens.

This detailed description, in connection with the drawings, is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An automated skinning apparatus for removing skin from a poultry carcass that hangs from a moving support, the skinning apparatus comprising:
   a. a first elongated, planar support wall and a second elongated, planar support wall, the second support wall parallel to, and spaced laterally apart from, the first support wall; and
   b. a neck skinner mounted to the first support wall laterally intermediate the first support wall and the second support wall, the neck skinner comprising:
      i. a rotatably-driven gripper having a plurality of elongated fins extending radially therefrom, at least one fin comprising an essentially flat surface at an outer end; and
      ii. a pinch block laterally intermediate the gripper and the second support wall, the pinch block having an arcuate surface terminating in a tapered lip in a close-clearance relationship with the gripper for trapping and pulling poultry skin into a pinch point defined therebetween.

2. The apparatus in accordance with claim 1, further comprising a shoulder skinner mounted to the first support wall laterally intermediate the first support wall and the second support wall and longitudinally adjacent the neck skinner, the shoulder skinner comprising:
   a. a rotatably-driven gripper having a plurality of fins extending radially therefrom; and
   b. a pinch block laterally intermediate the gripper and the first support wall, the pinch block having an arcuate surface terminating in a tapered lip in a close-clearance relationship with the gripper for trapping and pulling poultry skin into a pinch point defined therebetween.

3. An automated skinning apparatus for removing skin from a poultry carcass that hangs from a moving support, the skinning apparatus comprising:
   a. a first elongated, planar support wall and a second elongated, planar support wall, the second support wall parallel to, and spaced laterally apart from, the first support wall;
   b. a neck skinner mounted to the first support wall laterally intermediate the first support wall and the second support wall, the neck skinner comprising:
      i. a rotatably-driven gripper having a plurality of fins extending radially therefrom; and
      ii. a pinch block laterally intermediate the gripper and the second support wall, the pinch block having an arcuate surface terminating in a tapered lip in a close-clearance relationship with the gripper for trapping and pulling poultry skin into a pinch point defined therebetween; and
   c. a rotatably-driven indexing conveyor laterally intermediate the neck skinner and the second support wall, the indexing conveyor having a plurality of evenly-spaced guide prongs extending therefrom for engaging, and maintaining a minimum longitudinal separation between, lower ends of successive poultry carcasses that are conveyed through the skinning apparatus.

4. An automated skinning apparatus for removing skin from a poultry carcass that hangs from a moving support, the skinning apparatus comprising:
   a. a first elongated, planar support wall and a second elongated, planar support wall, the second support wall parallel to, and spaced laterally apart from, the first support wall;
   b. a neck skinner mounted to the first support wall laterally intermediate the first support wall and the second support wall, the neck skinner comprising:
      i. a rotatably-driven gripper having a plurality of fins extending radially therefrom; and
      ii. a pinch block laterally intermediate the gripper and the second support wall, the pinch block having an arcuate surface terminating in a tapered lip in a close-clearance relationship with the gripper for trapping and pulling poultry skin into a pinch point defined therebetween; and
   c. an elongated bumper rail mounted to the first support wall for maintaining a predetermined distance between the poultry carcass and the first support wall and between the poultry carcass and an indexing conveyor.

5. The apparatus in accordance with claim 4, wherein the bumper rail is adjustably spaced from the first support wall.

6. An automated skinning apparatus for removing skin from a poultry carcass that hangs from a moving support, the skinning apparatus comprising:
   a. a first elongated, planar support wall and a second elongated, planar support wall, the second support wall parallel to, and spaced laterally apart from, the first support wall;
   b. a neck skinner mounted to the first support wall laterally intermediate the first support wall and the second support wall, the neck skinner comprising:
      i. a rotatably-driven gripper having a plurality of fins extending radially therefrom; and
      ii. a pinch block laterally intermediate the gripper and the second support wall, the pinch block having an arcuate surface terminating in a tapered lip in a close-clearance relationship with the gripper for trapping and pulling poultry skin into a pinch point defined therebetween; and
   c. a first elongated guide rail mounted to the first support wall and a second elongated guide rail mounted to the second support wall, the second guide rail parallel to, and spaced laterally apart from, the first guide rail for limiting the lateral movement of a shackle line extending vertically between the guide rails.

7. The apparatus in accordance with claim 6, wherein the guide rails are adjustably spaced from the support walls.

8. An automated skinning apparatus for removing skin from a poultry carcass, the skinning apparatus comprising:
   a. a first elongated, planar support wall and a second elongated, planar support wall, the second support wall parallel to, and spaced laterally apart from, the first support wall;
   b. a neck skinner mounted to the first support wall laterally intermediate the first support wall and the second support wall, the neck skinner comprising:
      i. a rotatably-driven gripper having a plurality of fins extending radially therefrom; and
      ii. a pinch block laterally intermediate the gripper and the second support wall, the pinch block having an arcuate surface terminating in a tapered lip in a close-clearance relationship with the gripper for trapping and pulling poultry skin into a pinch point defined therebetween; and
   c. a shoulder skinner mounted to the first support wall laterally intermediate the first support wall and the second support wall and longitudinally adjacent the neck skinner, the shoulder skinner comprising:
      i. a rotatably-driven gripper having a plurality of fins extending radially therefrom; and
      ii. a pinch block laterally intermediate the gripper and the first support wall, the pinch block having an arcuate surface terminating in a tapered lip in a close-clearance relationship with the gripper for trapping and pulling poultry skin into a pinch point defined therebetween.

9. The apparatus in accordance with claim 8, further comprising a rotatably-driven indexing conveyor laterally intermediate the neck skinner and the second support wall, the indexing conveyor having a plurality of evenly-spaced guide prongs extending therefrom for engaging, and maintaining a minimum longitudinal separation between, lower ends of successive poultry carcasses that are conveyed through the skinning apparatus.

10. The apparatus in accordance with claim 8, further comprising an elongated bumper rail mounted to the first support wall for maintaining a predetermined distance between the poultry carcass and the first support wall and between the poultry carcass and the indexing conveyor.

11. The apparatus in accordance with claim 10, wherein the bumper rail is adjustably spaced from the first support wall.

12. The apparatus in accordance with claim 8, further comprising a first elongated guide rail mounted to the first support wall and a second elongated guide rail mounted to the second support wall, the second guide rail parallel to, and spaced laterally apart from, the first guide rail for limiting the lateral movement of a shackle line extending vertically between the guide rails.

13. The apparatus in accordance with claim 12, wherein the guide rails are adjustably spaced from the support walls.

14. A process for removing skin from a poultry carcass having a neck with neck skin attached thereto, the process comprising:
   a. conveying the poultry carcass into the skinning apparatus of claim 1;
   b. engaging the neck skin with the pinch point; and
   c. rotating the neck skinner gripper, thereby pulling the neck skin downwardly between the gripper and the neck skinner pinch block, whereby the neck skin is pulled from the neck of the poultry carcass.

15. A process for removing skin from a poultry carcass having a neck with neck skin attached thereto and shoulders with shoulder skin attached thereto, the process comprising:
   a. conveying the poultry carcass into the skinning apparatus of claim 8;
   b. engaging the neck skin with the neck skinner pinch point;
   c. rotating the neck skinner gripper, thereby pulling the neck skin downwardly between the neck skinner gripper and the neck skinner pinch block, whereby the neck skin is pulled from the neck of the poultry carcass;
   d. engaging the shoulder skin with the shoulder skinner pinch point; and
   e. rotating the shoulder skinner gripper, thereby pulling the shoulder skin downwardly between the shoulder skinner gripper and the shoulder skinner pinch block, whereby the shoulder skin is pulled from the poultry carcass.

16. A process for removing skin from a poultry carcass having a neck with neck skin attached thereto, the process comprising:
   a. engaging the neck skin with a neck skinner pinch point, the neck skinner pinch point defined by:
      i. a neck skinner gripper, the neck skinner gripper having a plurality of fins extending radially therefrom, at least one fin comprising an essentially flat surface at an outer end; and
      ii. a tapered lip of a neck skinner pinch block, the tapered lip in a close-clearance relationship with the neck skinner gripper, the neck skinner pinch block having an arcuate surface terminating in the tapered lip; and
   b. rotating the neck skinner gripper, thereby pulling the neck skin downwardly between the neck skinner gripper and the neck skinner pinch block, whereby the neck skin is pulled from the neck of the poultry carcass.

17. The process of claim 16 for removing skin from a poultry carcass, the poultry carcass further including shoulders with shoulder skin attached thereto, the process further comprising:
   a. engaging the shoulder skin with a shoulder skinner pinch point, the shoulder skinner pinch point defined by:
      i. a shoulder skinner gripper, the shoulder skinner gripper having a plurality of fins extending radially therefrom; and
      ii. a tapered lip of a shoulder skinner pinch block in a close-clearance relationship with the shoulder skinner gripper, the shoulder skinner pinch block having an arcuate surface terminating in the tapered lip; and
   b. rotating the shoulder skinner gripper, thereby pulling the shoulder skin downwardly between the shoulder skinner gripper and the shoulder skinner pinch block, whereby the shoulder skin is pulled from the neck of the poultry carcass.

* * * * *